(12) United States Patent
Herman et al.

(10) Patent No.: US 6,275,954 B1
(45) Date of Patent: *Aug. 14, 2001

(54) METHOD AND APPARATUS FOR ANALYZING DATA

(75) Inventors: Jeffrey A. Herman, Palo Alto; Kevin T. Looney, Sunnyvale, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/318,480

(22) Filed: May 25, 1999

Related U.S. Application Data

(63) Continuation of application No. 08/939,755, filed on Sep. 29, 1997, now Pat. No. 5,954,826.

(51) Int. Cl.[7] .................................................. H04N 7/18
(52) U.S. Cl. .................. 714/25; 714/37; 714/46; 707/513; 707/516
(58) Field of Search ........................ 714/25, 37, 38, 714/46, 47; 707/513, 514, 515, 516

(56) References Cited

U.S. PATENT DOCUMENTS

| | | |
|---|---|---|
| 4,873,623 | 10/1989 | Lane et al. . |
| 5,404,530 | 4/1995 | Koyanagi et al. . |
| 5,438,661 | 8/1995 | Ogawa . |
| 5,452,449 | 9/1995 | Baldwin, Jr. et al. . |
| 5,586,059 | 12/1996 | Oshelski et al. . |
| 5,748,878 | 5/1998 | Rees et al. . |
| 5,757,673 | 5/1998 | Oshelski et al. . |
| 5,831,669 | * 11/1998 | Adrain .................................. 348/143 |
| 5,954,826 | * 9/1999 | Herman et al. ......................... 714/46 |

FOREIGN PATENT DOCUMENTS

WO 9108542   6/1991   (WO) .

* cited by examiner

*Primary Examiner*—Ly V. Hua
(74) *Attorney, Agent, or Firm*—The Hecker Law Group (57) ABSTRACT

The present invention comprises a method and apparatus for receiving data analysis instructions from a user and for displaying results of the data analysis to the user. In one embodiment, the invention provides a series of interface windows displayed on a computer display screen. A first window allows a user to select one or more specification files comprising reference data specifying capabilities and or resources with which other data is to be compared. A second window allows the user to select one or more data files to be compared to the one or more specification files selected using the first window. A third window allows the user to interactively select the type of analysis to be performed and provides the results of the selected analysis to the user. The third window also allows the user to interactively apply one or more filters to the results and to select the manner (view) in which the results are displayed.

36 Claims, 10 Drawing Sheets

METHOD AND APPARATUS FOR ANALYZING DATA

This is a continuation of application Ser. No. 08/939,755, filed Sep. 29, 1997 U.S. Pat. No. 5,954,826.

BACKGROUND OF THE INVENTION

1. Field of the Invention

The present invention relates to a method and apparatus for analyzing data.

2. Background Art

Often it is desired to compare one type of data to another type of data. One example is when it is desired to determine whether a person can perform a particular task. In that case, data comprising a list of the skills that the person possesses are compared to data comprising a list of the skills required for the task. Another example is when it is desired to determine the compatibility of a computer program with a particular platform or environment. In that case, data comprising the computing resources required by the computer program is compared to data comprising the resources available on the platform or from the environment.

When writing applications for environments, it is important to be able to analyze the applications for compatibility with the intended device. Debugging programs have been used in the past to provide some analysis capabilities. However, current debugging programs do not provide flexibility in selecting platforms and applications to analyze, in sorting and displaying the results, and in providing graphical representations of comparison results.

SUMMARY OF THE INVENTION

The present invention comprises a method and apparatus for receiving data analysis instructions from a user and for displaying results of the data analysis to the user. In one embodiment, the invention provides a series of interface windows displayed on a computer display screen. A first window allows a user to select one or more specification files comprising reference data specifying capabilities and or resources with which other data is to be compared. A second window allows the user to select one or more data files to be compared to the one or more specification files selected using the first window. A third window allows the user to interactively select the type of analysis to be performed and provides the results of the selected analysis to the user. The third window also allows the user to interactively apply one or more filters to the results and to select the manner (view) in which the results are displayed

DETAILED DESCRIPTION OF THE INVENTION

A method and apparatus for analyzing data is described. In the following description, numerous specific details are set forth in order to provide a more thorough description of the invention. It will be apparent, however, to one skilled in the art that the invention may be practiced without these specific details. In other instances, well-known features have not been described in detail so as not to obscure the invention.

Figure 1:
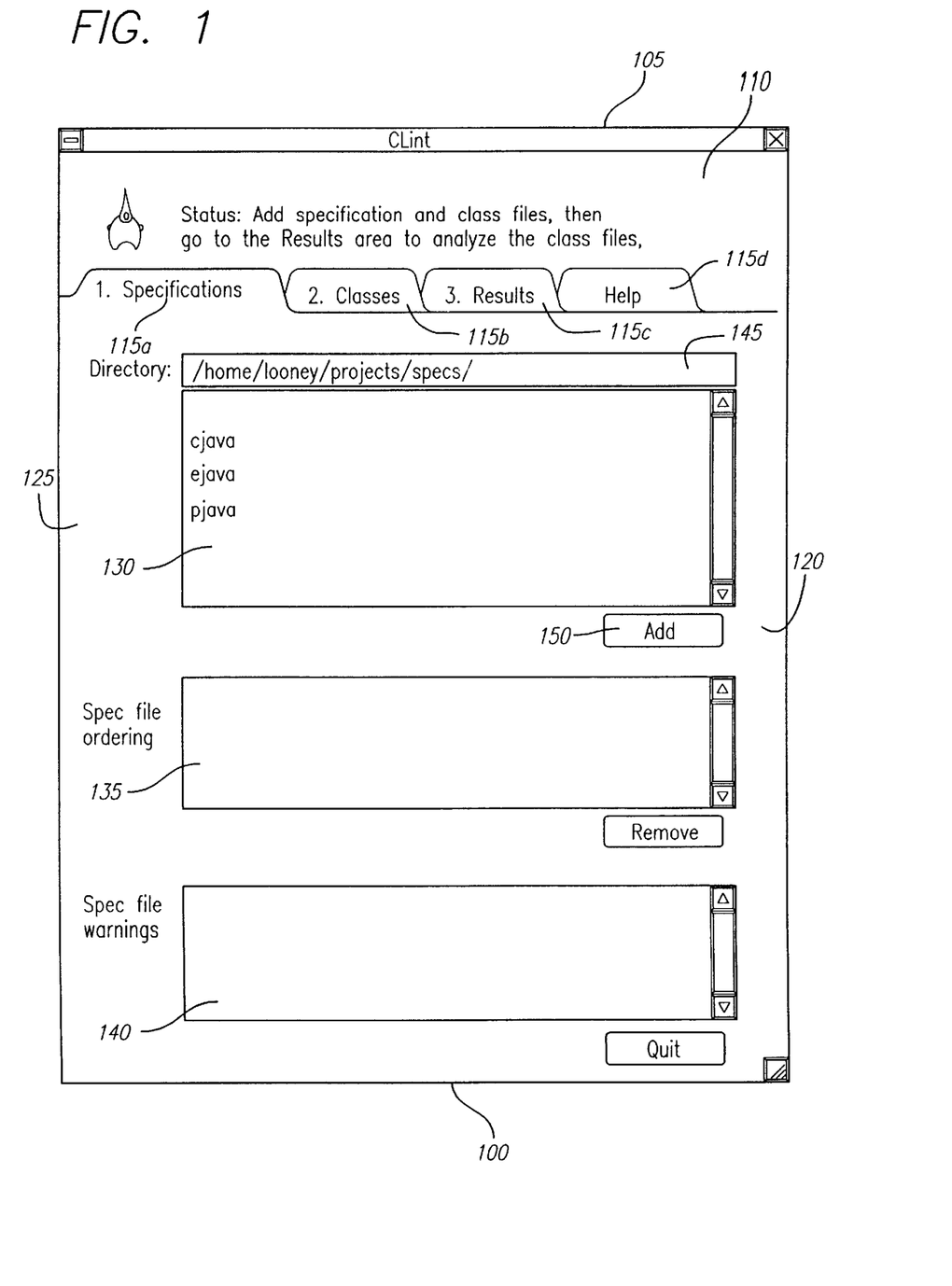
FIG. 1 shows an example of a display screen used in one or more embodiments of the invention.

FIG. 1 shows an example of a display screen used in one or more embodiments of the invention. The display screen of FIG. 1 is used in an embodiment of the invention that compares data comprising computer program code written in the Java programming language with data describing the specifications of different types of Java operating environments. For example, different implementations of Java exist for different types of hardware platforms, ranging from "smartcards" to supercomputers. Examples of scaled down implementations of Java include Personal Java for use in consumer devices for home, office and mobile use and Embedded Java for use in embedded systems. Personal Java and Embedded Java do not provide the same range of resources as more complete forms of Java, such as, for example, Business Java. It is useful for a developer to know whether a Java program is compatible with (i.e. can be executed using) the different Java platforms. The embodiment of FIG. 1 compares user selected program files with user selected operating environment specifications and informs the user of the degree of compatibility between the two. The operation of the program is described in copending U.S. pat. application Ser. No. 08/939,756 for Method and Apparatus for Assessing Compatibility Between Platforms and Applications filed on Sep. 29, 1997, and incorporated by reference herein.

The display screen 100 of FIG. 1 may comprise the whole screen of a computer display or may constitute a resizable window. As shown in FIG. 1, display screen 100 includes a title bar 105, a status message area 110, page tabs 115a–d, and page display area 120.

Title bar 105 displays a title, for example the name of the program that displays display screen 100. Status message area 110 displays messages indicating status, problems, instructions or other information. Page tabs 115a, 115b, 115c, and 115d are used to select a corresponding page for display in page display area 120. Page tab 115a selects a page that is used by the user to select the file or files containing the specifications of the Java implementations for which the user wants to determine the compatibility of Java programs. Page tab 115b selects a page that is used by the user to select the file or files containing the program code that the user wants to be tested for compatibility with the Java implementations selected by the user using page tab 115a. Page tab 115c selects a page that is used by the user to select the type of analysis to be performed and that displays the results of the analysis to the user. Page tab 115d selects a "Help" page.

In FIG. 1, page tab 115a is shown as having been selected. Accordingly, a specification file input page 125 is displayed in page display area 120. As shown in FIG. 1, specification file input page 125 includes a directory display area 130, a specification file display area 135, and a message display area 140.

Directory display area 130 displays file directory information. It is used by the user to select directories in which specification files are located, and then to select specification files from the displayed directory. For example, in the example of FIG. 1, the user has selected the directory "/home/looney/projects/specs", as shown in directory path information area 145. The files in the selected directory, as shown in directory display area 130, are named "cjava," "ejava," and "pjava." In this example, these files contain specifications for different Java platforms. In other embodiments, the specification files may contain specifications for other types of resources or requirements. A user may select one or more of specification files shown in directory display area 130 by any of a variety of well known selection techniques. For example, the user may select a file name by clicking on the name using a mouse or other pointing device and then clicking "add" button 150, or the user may simply double-click on a file name. Any of a variety of other selection techniques may be used. After a specification file is selected by the user, it is listed in specification file display area 135.

Message display area 140 is used to display informational messages to the user regarding the specification files the user has selected. The messages may include error, status, warning and other informational messages. For example, a warning message may be displayed if the file that was selected is not a proper specification file or if a specification file has been corrupted. Information concerning the content of selected specification files may also be displayed. For example, if more than one specification file has been selected, a message may be displayed that indicates differences between the specification files (e.g. differences in classes supported).

Figure 2:
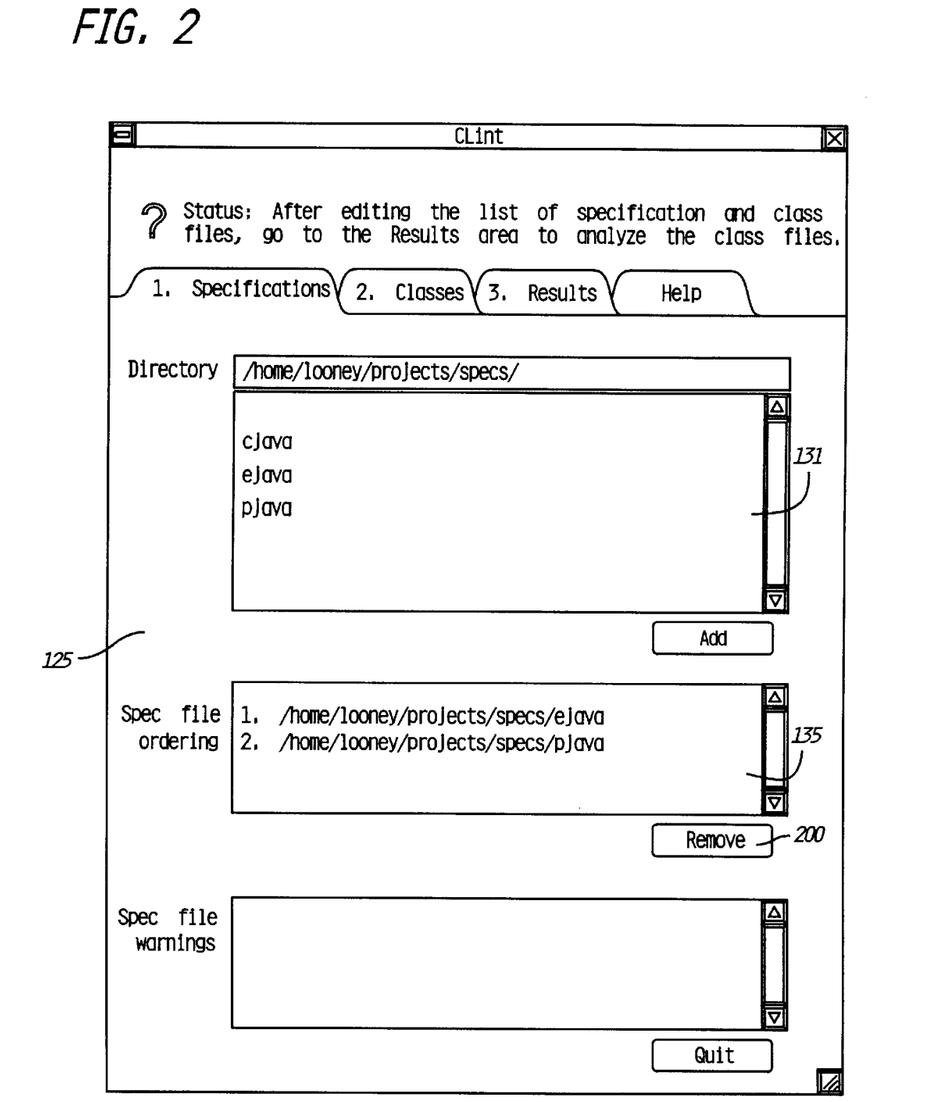
FIG. 2 shows an example of a display screen used in one or more embodiments of the invention.

FIG. 2 shows specification input page 125 of FIG. 1 after two of the specification files listed in directory display area 130 have been selected by the user. In the example of FIG. 2, the selected specification files are listed in order of selection by the user, and directory path information for each file is displayed. In the example of FIG. 2, a specification file can be removed from specification file display area 135 by selecting the file using a pointing device and clicking on "remove" button 200.

Figure 3:
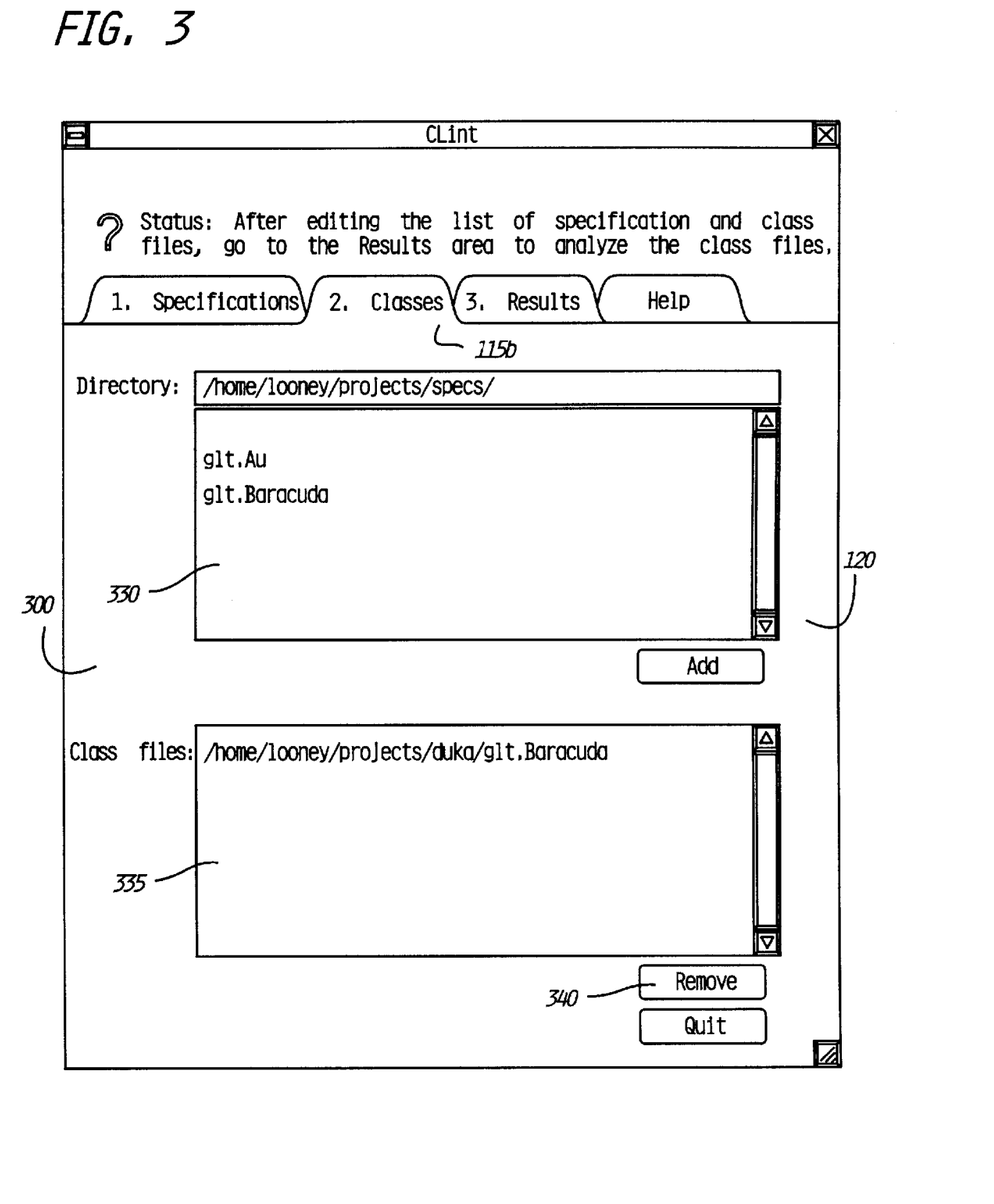
FIG. 3 shows an example of a display screen used in one or more embodiments of the invention.

FIG. 3 shows a program file selection page 300 that is displayed when page tab 115b of the example of FIG. 1 is selected. As shown in FIG. 3, file selection page 300 includes a directory display area 330 and a program file display area 335.

Directory display area 330 of file selection page 300 is used in the same manner as directory display area 130 of specification file input page 125 to select program files that the user wishes to test for compatibility with the specification files selected by the user using specification file input page 125. The user may select the program files using, file selection page 300 before or after selecting specification files using specification input page 125. The files selected by the user for testing are listed in program file display, area 335. A file may be removed from program file display area 335 by selecting the file using a pointing device and clicking "remove" button 340.

Figure 4:
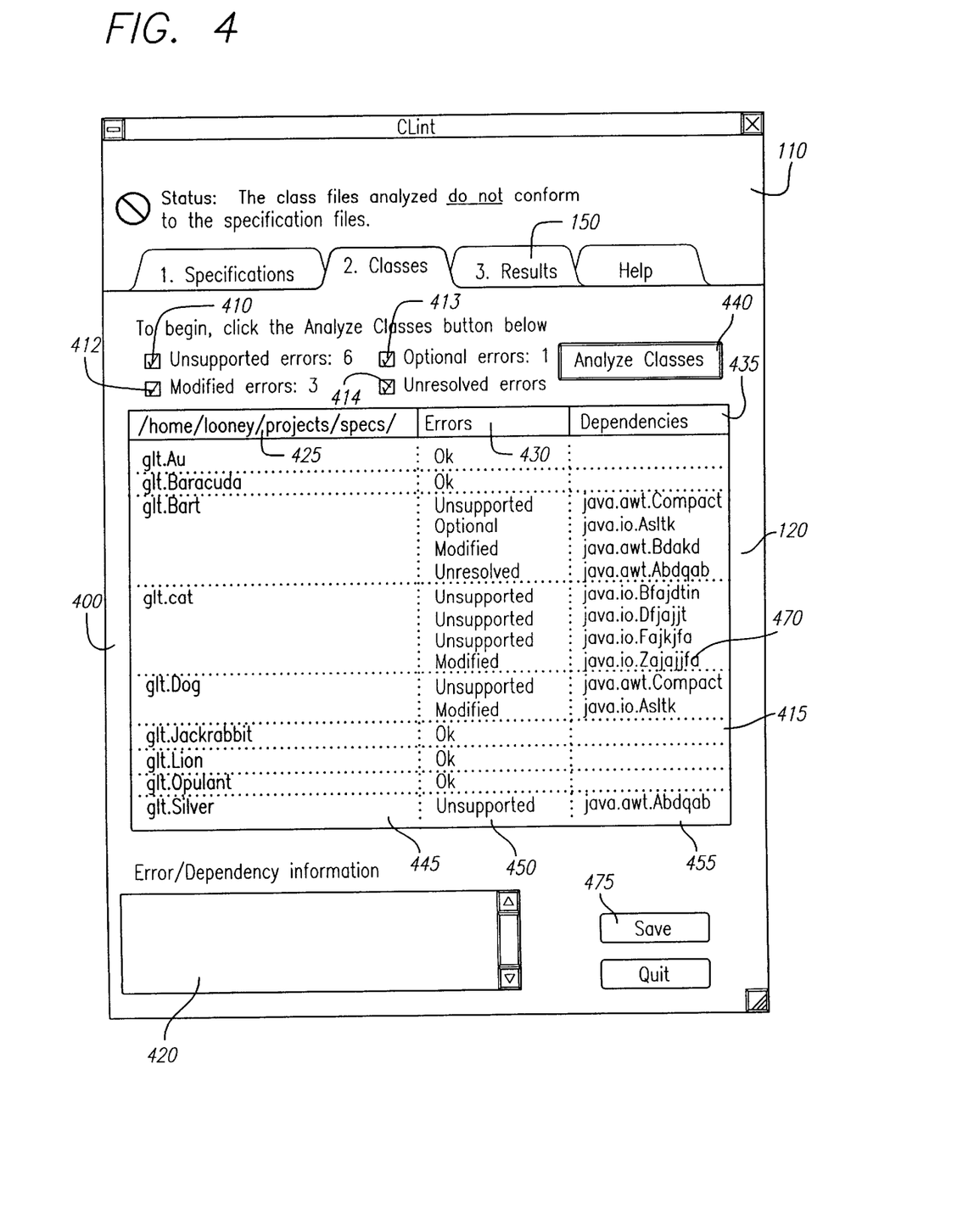
FIG. 4 shows an example of a display screen used in one or more embodiments of the invention.

FIG. 4 shows a data analysis page 400 that is displayed when page tab 115c of FIG. 1 is selected. In order to use data analysis page 400, at least one specification file and one program file must first have been selected by the user using specification file input page 125 and file selection page 300. Otherwise, an error message will be displayed in status message area 110.

In the example of FIG. 4, data analysis page 400 includes an analysis criteria selection area 410, a result display area 415, and an information display area 420.

Analysis criteria selection area 410 contains interface controls that allow a user to specify the type of information that the user wishes to obtain. In the example of FIG. 4, analysis criteria selection area 410 includes four check boxes 411, 412, 413 and 414, respectively, that allow the user to select the kind of error information that the user wishes to have displayed in result display area 415. A user may select a check box, for example, by clicking on it using a pointing device such as a mouse. In the example of FIG. 4, the analysis criteria comprises various filters that can be applied to the analysis. In other embodiments, other types of analysis criteria may be specified. In FIG. 4, check box 411 allows the user to display "unsupported errors." Check box 412 allows the user to display "modified errors." Check box 413 allows the user to display "optional errors." Check box 414 allows the user to display "unresolved errors."

In one or more embodiments of the invention, errors are identified as follows. An attempt is made to resolve application references within the application. However, the application may contain external references that cannot be resolved within the application. If neither the application nor the operating platform contains an element that can resolve a reference, the reference is unresolvable.

If a reference cannot be resolved within the application, the merged specification is examined to determine whether the operating platform contains a programming resource that can be used to resolve the reference. If the programming resource is found, a compliance status associated with the programming resource is examined to determine whether it is available for use by the application. If the programming resource has a compliance status of "required," the operating platform is required to include the programming resource and the application's reference is reported as resolved. An "optional" compliance status indicates that the entry may or may not be included in the operating platform. If the optional status is not overridden by a subsequently-processed specification, the reference is reported in error (e.g., the reference is to an unimplemented optional programming resource). A "modified" compliance status indicates that the programming resource associated with a the entry has been changed. An "unsupported" compliance status indicates that the application's reference is not supported by the operating platform. A status of "optional," "modified" or "unsupported" resolves the reference, but indicates a potential problem with that reference.

Either a warning or error message is generated for those references that are not resolved to the application programming resource or a "required" specification programming resource. A "non-conformance" warning is generated for those references that resolve to a "modified" specification programming resource, or for a reference that does not resolve to a programming resource (i.e., an "unresolved" status). A reference that resolves to an "unsupported" or "optional" specification programming resource causes a "non-conformance" error.

In the example of FIG. 4, all four check boxes are shown as having been selected, which is the default display mode for the embodiment of FIG. 4. Accordingly, all four types of errors will be displayed in result display area 415, unless the user elects to uncheck one or more boxes.

The user may initiate the data analysis by clicking "analyze classes" button 440 ("class" is a name used for Java program files). The results of the analysis (i.e. testing the user selected program files for compatibility with the user selected specification files) are displayed in result display area 415. In addition, in the example of FIG. 4, the number of each of the error types selected by the user that are found during the analysis is displayed next to the error type name in analysis criteria selection area 410, and a message indicating information about the analysis performed (e.g. "The class files analyzed do not conform to the specification files") is displayed in status message area 110.

In the example of FIG. 4, the results are displayed in chart form in result display window 415. In FIG. 4, the chart includes three columns 445, 450, and 455, respectively. Each column includes a title bar that identifies the content of the column. Title bar 425 identifies the content of column 445 as "classes analyzed." Title bar 430 identifies the contend of column 450 as "errors." Title bar 435 identifies the content of column 455 as "dependencies." Each row of the chart corresponds to a particular result: either an error indication or an "OK" indication. Column 445 lists the program (class) file name to which the result displayed in a row pertains. Column 450 identifies the result (by specifying either "OK" or the type of error). Column 455 identifies the particular element of the program file that is the cause of an error specified in column 450 (e.g. a resource or dependency that is required by the program file but that is lacking in the specification file to which the program file is being compared).

Figure 5:
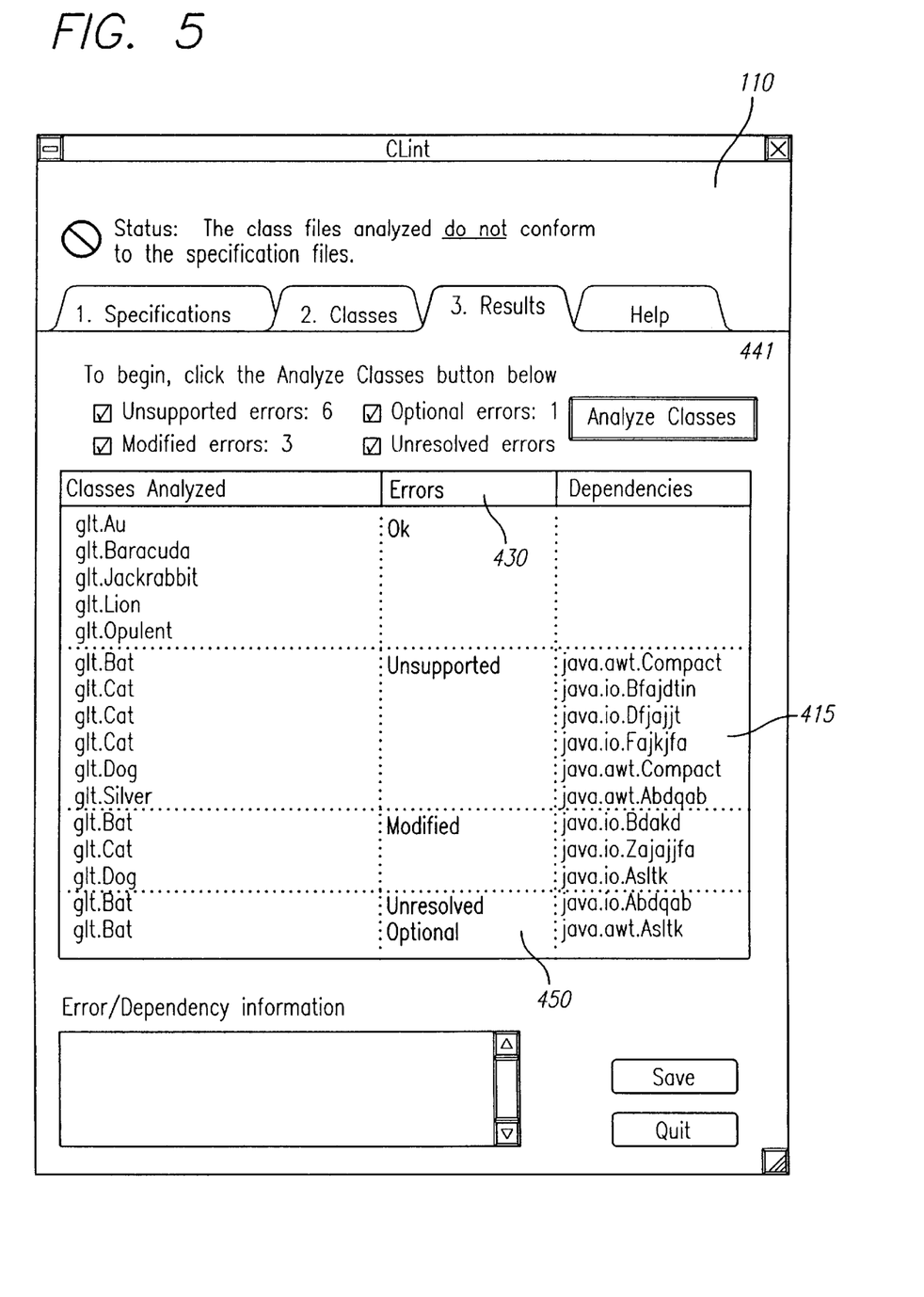
FIG. 5 shows how results may be reordered in one or more embodiments of the invention.
Figure 6:
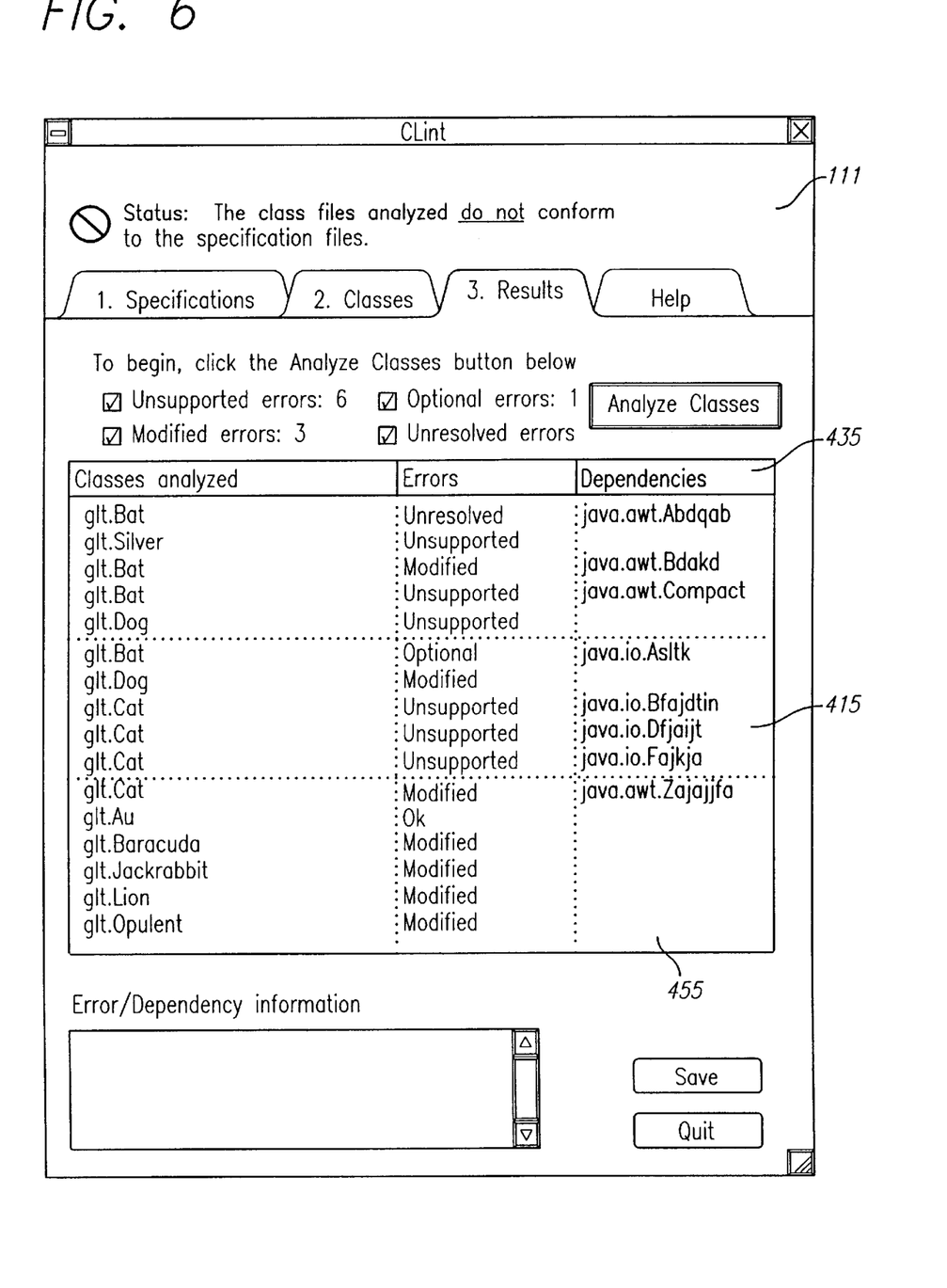
FIG. 6 shows how results may be reordered in one or more embodiments of the invention.

Data analysis page 400 allows the user to interactively filter and sort the data results that are displayed in result display area 415. For example, the user may change the kinds of errors that are displayed by checking or unchecking one or more of check boxes 411–414 in analysis criteria selection area 410. The user may also change the order in which the results are displayed in result display area 415 by clicking on any of title bars 425, 430, and 435. Clicking on a title bar sorts the results listed in result display area 415 by the contents of the column to which the title bar corresponds. For example, in FIG. 4, title bar 425 of column 445 is shown as having been selected by the user. Accordingly, the results shown in result display area 415 are sorted by program (class) file name. FIG. 5 shows how the results of FIG. 4 are reordered when title bar 430 is selected such that the results shown in result display area 415 are sorted according to the error type listed in column 450. FIG. 6 shows how the results of FIG. 4 are reordered when title bar 435 is selected such that the results shown in result display area 415 are sorted according to the error identification information listed in column 455.

Referring again to FIG. 4, information display area 420 is used to display additional result information when a particular result listed in result display area 415 is selected. For example, if the user clicks on entry 470 in column 455, additional explanatory information, if any, available for the entry "java.io.Zajajjfa" is displayed in information display area 420.

A user may save the results displayed on data analysis page 400 in a file by clicking "save" button 475.

Figure 7:
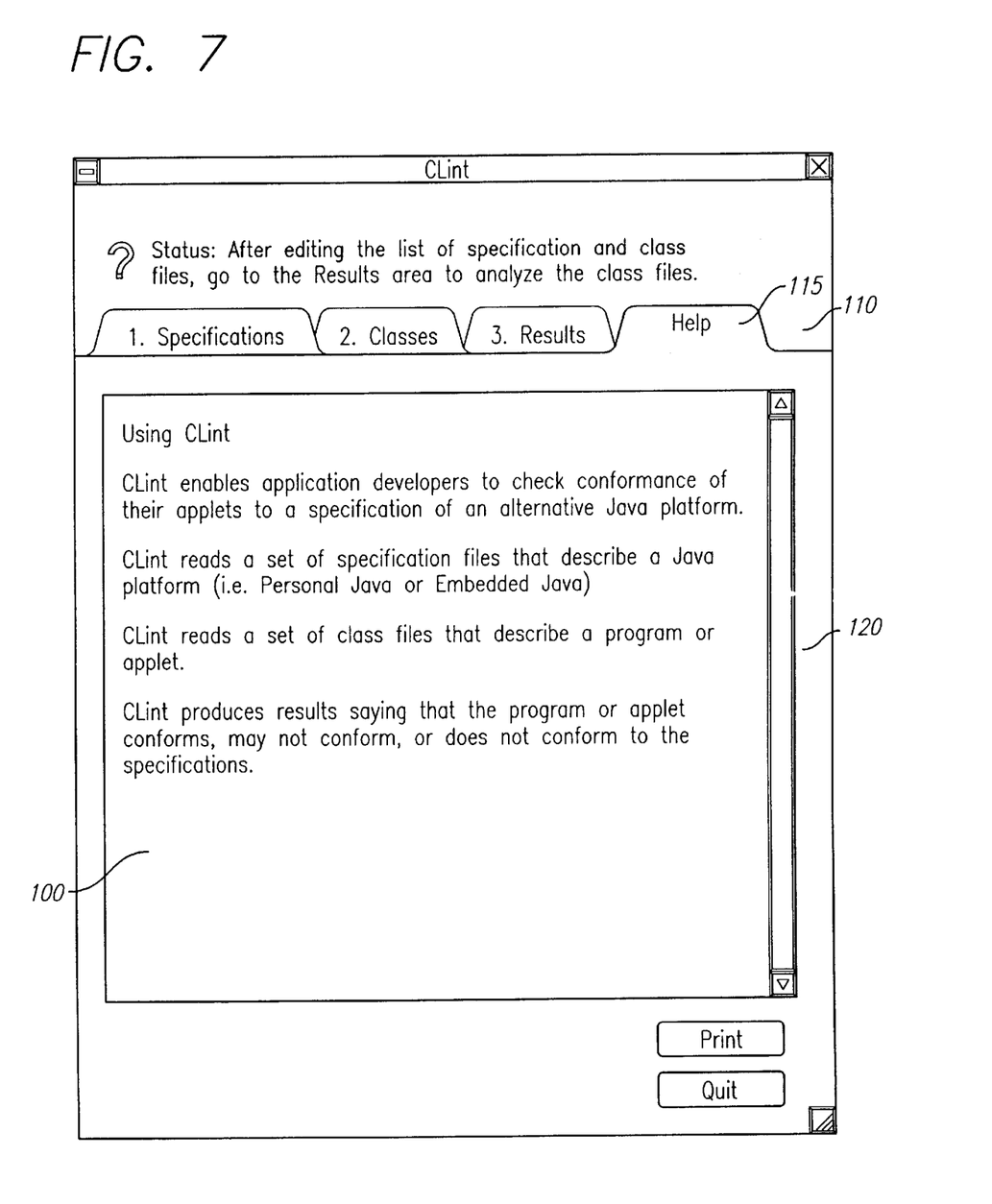
FIG. 7 shows an example of a display screen used in one or more embodiments of the invention.

FIG. 7 shows an example of a help page 700 that is displayed in page display area 120 when page tab 115b of FIG. 1 is selected by the user. Help page 700 displays help information as is well known in the art.

Figure 8A:
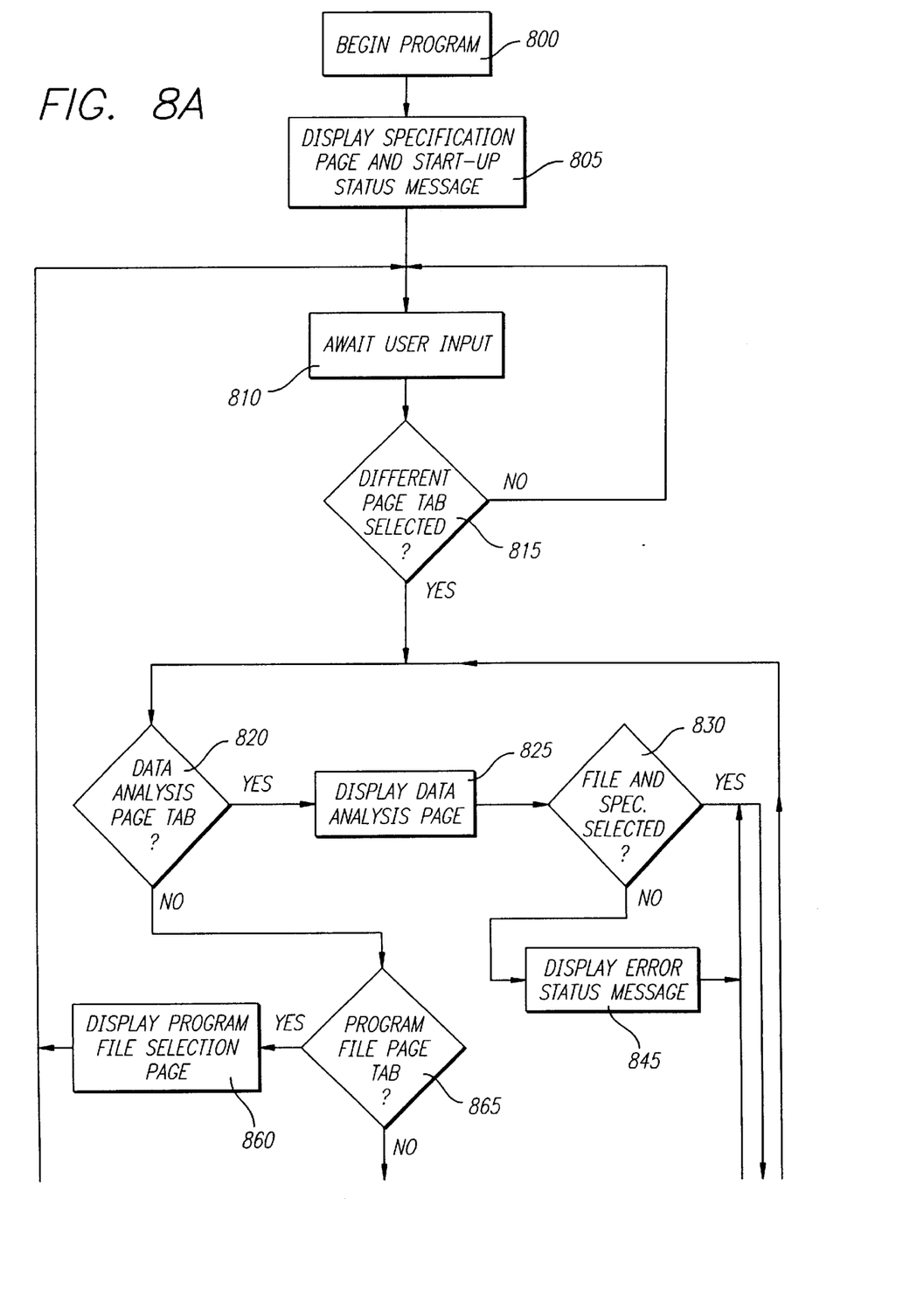
FIGS. 8A and 8B are a flow chart for one or more embodiments of the invention.
Figure 8B:
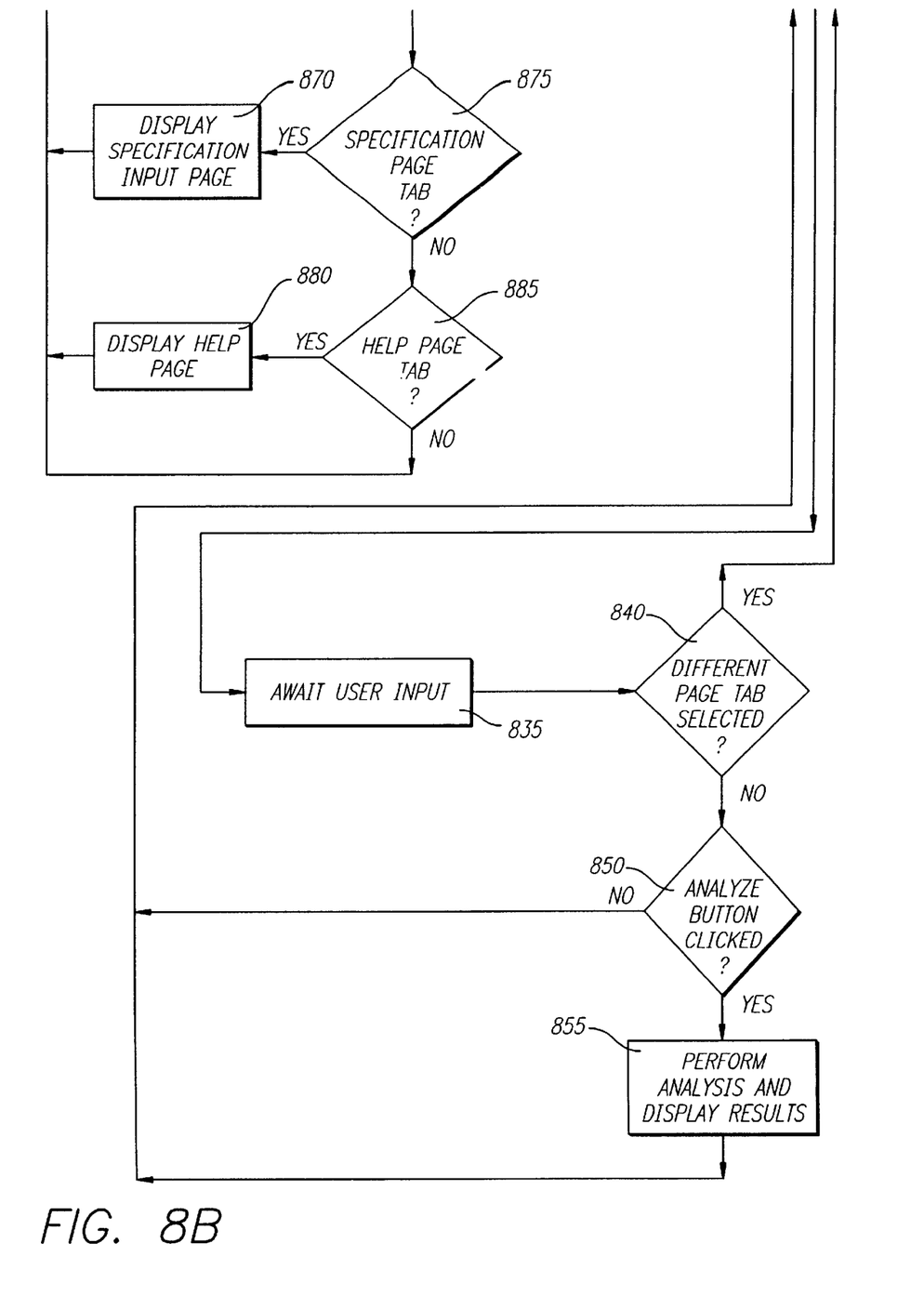

FIG. 8 is a flow chart for a process used in one or more embodiments of the invention. In the process of FIG. 8, the program begins at block 800. At block 805, the initial screen of the program is displayed. The initial screen may, for example, be screen 100 of FIG. 1, and preferably includes page tabs such as tabs 115a–d and a page display area such as page display area 125 that displays different user interface pages corresponding to the page tab that has been selected. In the example of FIG. 8, the initial page displayed in the page display area of the screen when the program is first activated is a specification input page, for example specification input page 125. A default start-up status message is also displayed in a status message display area, such as message display area 110.

At block 810, user input is awaited. After user input is received, a determination is made at block 815 as to whether a different page tab from the currently selected page tab has been selected. If not, additional user input is awaited at clock 810.

If a different page tab has been selected, a determination is made at block 820 as to whether the page tab that has been selected is a data analysis page tab, such as data analysis page tab 115c. If it is determined that a data analysis page tab has been selected, the data analysis page is displayed in the page display area at block 825.

At block 830, a determination is made as to whether at least one program file and one specification file have already been selected by the user. If yes, additional user input is awaited at block 835. If not, an error message is displayed in the status message display area at block 845, and then user input is awaited at block 835.

After user input is received at block 835, a determination is made at block 840 as to whether a different page tab has been selected. If yes, processing continues to block 820. If not, a determination is made at block 850 as to whether an analyze button shown on the data analysis page, such as analyze button 440, has been activated. If not, processing returns to block 835. If yes, data analysis corresponding to criteria indicated by the user's input is performed and the results displayed to the user at block 855. From block 855, processing continues to block 835.

If at block 820 it is determined that the new page tab selected is not the data analysis page tab, a determination is made at block 865 as to whether the page tab that has been selected is a program file selection page tab, such as program file selection page tab 115b. If yes, a program file selection page, such as program file selection page 300, is displayed in the page display area at block 860, and processing continues to block 810. If not, processing continues to block 875.

At block 875 a determination is made as to whether the page tab that has been selected is a specification file input page tab, such as specification file input page tab 115a. If yes, a specification file input page, such as specification file input page 125, is displayed in the page display area at block 870, and processing continues to block 810. If not, processing continues to block 885.

At block 885 a determination is made as to whether the page tab that has been selected is a help page tab, such as help page tab 115d. If yes, a help page, such as help page 700, is displayed in the page display area at block 880, and processing continues to block 810. If not, processing continues directly to block 810.

Figure 9:
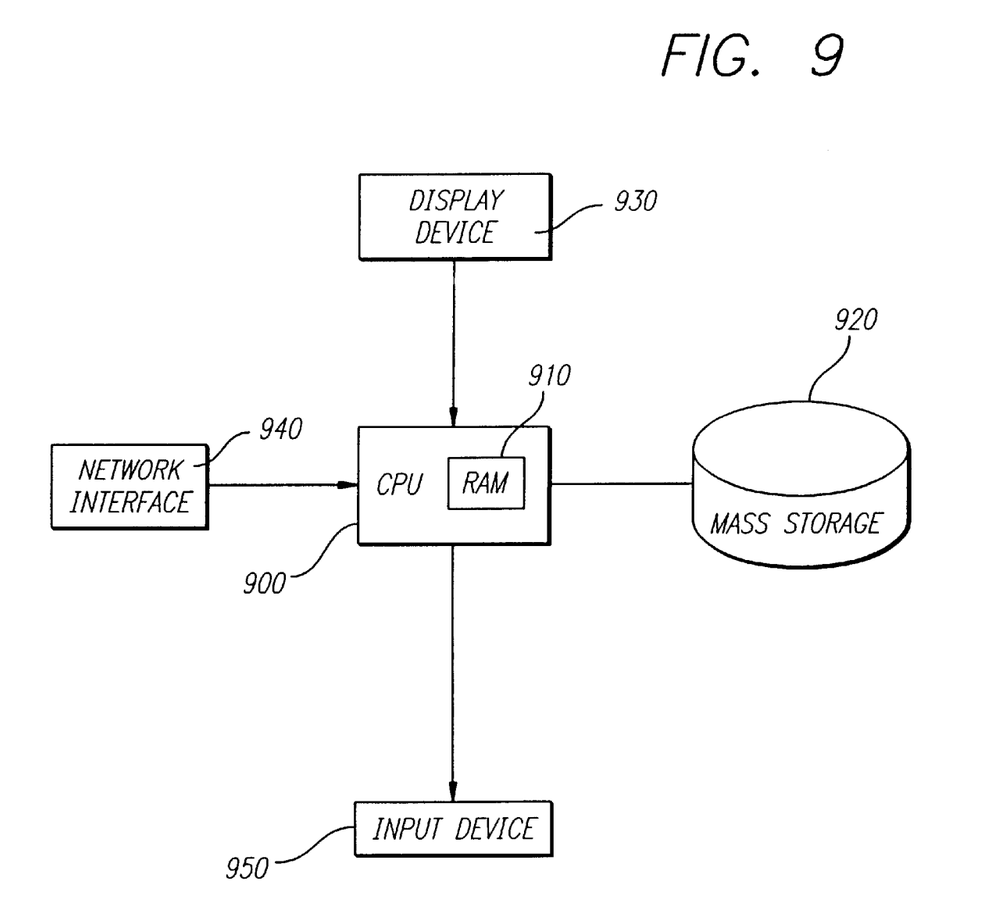
FIG. 9 is a block diagram of an example computer system that may be used to implement one or more embodiments of the invention.

The invention may be implemented by means of appropriate software on the computer system of FIG. 9. The exemplary computer system shown in FIG. 9 includes a CPU unit 900 that includes a central processor, main memory 910, peripheral interfaces, input-output devices, power supply, and associated circuitry and devices; a display device 930 which may be a cathode ray tube display, LCD display, gas-plasma display, or any other computer display; an input device 950, which may include a keyboard, mouse, digitizer, or other input device; non-volatile storage 920, which may include a floppy disk drive, a RAM card, hard drive, CD-ROM drive, or other magnetic, re-writable optical, or other mass storage devices; and a network interface 940, which may include a modem, allowing the computer system to communicate with other systems over a communications network such as the Internet. Any of a variety of other configurations of computer systems may also be used.

Thus, a method and apparatus for analyzing data has been presented. Although the present invention has been described with respect to certain example embodiments, it will be apparent to those skilled in the art that the present invention is not limited to these specific embodiments. Further, although the operation of certain embodiments has been described in detail using certain detailed process steps, some of the steps may be omitted or other similar steps may be substituted without departing from the scope of the invention. Other embodiments incorporating the inventive features of the present invention will be apparent to those skilled in the art. The invention is defined by the claims and their full scope of equivalents.

What is claimed is:

1. A method for analyzing data comprising:
    performing data analysis using elements comprising:
        at least one reference file information obtained from a plurality of file directories via a reference file interface;
        at least one source file information obtained from said plurality of file directories via a source file interface, wherein a user utilizes said source file interface to select said at least one source file information; and
        data analysis criteria obtained via a data analysis interface;
    displaying results of said data analysis to a user via said data analysis interface.

2. The method of claim 1, further comprising:
    displaying a respective interface in response to the user selecting a respective page tab, wherein at least one of said reference file interface, said source file interface, and said data analysis interface comprises a page.

3. The method of claim 1, further comprising:
    displaying a directory display area from which the user can select a directory, and from which the user can select a reference file from a selected directory.

4. The method of claim 3, further comprising:
    displaying a reference file display area comprising a list of selected reference files.

5. The method of claim 3, further comprising:
    displaying, in a message display area, a message associated with a selected reference file.

6. The method of claim 1, further comprising:
    displaying a directory display area from which the user can select a directory, and from which the user can select a source file from a selected directory.

7. The method of claim 6, further comprising:
    displaying a source file display area comprising a list of selected source files.

8. The method of claim 1, further comprising:
    displaying an analysis criteria selection area from which the user can select said data analysis criteria; and
    displaying a result display area.

9. The method of claim 8, wherein said step of displaying said result display area further comprises:
    displaying a table comprising a first column and a second column, said first column comprising one or more analyzed source files and said second column comprising one or more result identifiers associated with said one or more analyzed source files.

10. The method of claim 9, wherein said step of displaying said table comprises:
    displaying a third column, said third column comprising error identification information.

11. The method of claim 1, wherein said step of performing said data analysis comprises:
    applying one or more filters to said data analysis based on said data analysis criteria.

12. A computer program product comprising:
    a computer usable medium having computer readable program code embodied therein for analyzing data, said computer program product comprising:
    computer readable program code configured to cause a computer to perform data analysis using elements comprising:
        at least one reference file information obtained from a plurality of file directories via a reference file interface;
        at least one source file information obtained from said plurality of file directories via a source file interface; and
        data analysis criteria obtained via a data analysis interface;
    a computer readable program code configured to cause a computer to display results of said data analysis to a user via said data analysis interface.

13. The computer program product of claim 12, further comprising:
    computer readable program code configured to cause a computer to display a respective interface in response to the user selecting a respective page tab, wherein at least one of said reference file interface, said source file interface, and said data analysis interface comprises a page.

14. The computer program product of claim 12, further comprising:
    computer readable program code configured to cause a computer to display a directory display area from which the user can select a directory, and from which the user can select a reference file from a selected directory.

15. The computer program product of claim 14, further comprising:
    computer readable program code configured to cause a computer to display a reference file display area comprising a list of selected reference files.

16. The computer program product of claim 14, further comprising:
    computer readable program code configured to cause a computer to display, in a message display area, a message associated with a selected reference file.

17. The computer program product of claim 12, further comprising:
    computer readable program code configured to cause a computer to display a directory display area from which the user can select a directory, and from which the user can select a source file from a selected directory.

18. The computer program product of claim 17, further comprising:
  computer readable program code configured to cause a computer to display a source file display area comprising a list of selected source files.

19. The computer program product of claim 12, wherein said computer readable program code configured to cause a computer to display said data analysis interface comprises:
  computer readable program code configured to cause a computer to display an analysis criteria selection area from which the user can select said data analysis criteria; and
  computer readable program code configured to cause a computer to display a result display area.

20. The computer program product of claim 19, wherein said computer readable program code configured to cause a computer to display said result display area further comprises:
  computer readable program code configured to cause a computer to display a table comprising a first column and a second column, said first column comprising one or more analyzed source files and said second column comprising one or more result identifiers associated with said one or more analyzed source files.

21. The computer program product of claim 20, wherein said computer readable program code configured to cause a computer to display said table comprises:
  computer readable program code configured to cause a computer to display a third column, said third column comprising error identification information.

22. The computer program product of claim 12, wherein said computer readable program code configured to cause a computer to perform said data analysis comprises:
  computer readable program code configured to cause a computer to apply one or more filters to said data analysis based on said data analysis criteria.

23. In a computer system, an apparatus comprising:
  at least one reference file information;
  at least one source file information wherein a user utilizes a source file interface to select said at least one source file; and
  a data analysis interface from which the user selects data analysis criteria, said data analysis interface displaying results of data analysis performed using said reference file information, said source file information, and said data analysis criteria.

24. The apparatus of claim 23, further comprising:
  a reference file interface from which at least one of said reference file information is obtained; and
  a source file interface from which at least one of said source file information is obtained.

25. The apparatus of claim 24, further comprising one or more page tabs, wherein one or more of said reference file interface, said source file interface and said data analysis interface comprise a page that is selectable via said one or more page tabs.

26. The apparatus of claim 24, wherein said reference file interface comprises:
  a directory display area from which the user can select a directory, and from which the user can select a reference file from a selected directory.

27. The apparatus of claim 26, wherein said reference file interface further comprises:
  a reference file display area having a list of selected reference files.

28. The apparatus of claim 26, wherein said reference file interface further comprises a message display area configured to display a message associated with a selected reference file.

29. The apparatus of claim 24, wherein said source file interface comprises:
  a directory display area from which the user can select a directory, and from which the user can select a source file from a selected directory.

30. The apparatus of claim 29, wherein said source file interface further comprises:
  a source file display area having a list of selected source files.

31. The apparatus of claim 23, wherein said data analysis interface comprises:
  an analysis criteria selection area from which the user can select said data analysis criteria; and
  a result display area.

32. The apparatus of claim 31, wherein said result display area comprises:
  a table comprising a first column and a second column, said first column comprising one or more analyzed source files, and said second column comprising one or more result identifiers associated with said one or more analyzed source files.

33. The apparatus of claim 32, wherein said table further comprises:
  a third column comprising error identification information.

34. The apparatus of claim 23, further comprising one or more data analysis filters selectable by said data analysis criteria.

35. The apparatus of claim 23, wherein said reference file information comprises one or more platform specifications, and said source file information comprises one or more program files.

36. A method for analyzing data comprising:
  performing data analysis using elements comprising at least one reference file information from a plurality of file directories at least one source file information from said plurality of file directories, and data analysis criteria;
  displaying results of said data analysis via a data analysis interface.

* * * * *